3,166,545
POLYMERIZATION OF ISOBUTYLENE WITH AN ALUMINUM - TITANIUM DIOXIDE - TITANIUM TETRACHLORIDE CATALYST

George F. Pezdirtz, Hampton, Va., assignor to Texaco Inc., New York, N.Y., a corporation of Delaware
No Drawing. Filed Apr. 6, 1961, Ser. No. 101,047
5 Claims. (Cl. 260—94.8)

This invention relates to the catalytic polymerization of isobutylene. In its more specific aspect, this invention relates to an improved catalyst adapted for use in the polymerization of isobutylene, and to the method of making such catalyst.

The polymerization of unsaturated aliphatic hydrocarbons, such as olefins or mixtures thereof with a suitable catalytic material to form compounds of higher molecular weight is well known. However, in the polymerization of isobutylene employing known catalyst, such as $BF_3$, it often is not possible to obtain high molecular weight polymers. This invention has therefore as its purpose to provide for a new and improved catalyst for the polymerization of isobutylene to high molecular weight polymers, particularly higher molecular weight polymers heretofore not readily obtainable was known catalyst materials, and to the method of making the catalyst.

In general, the polymerization catalyst of our invention comprises the product resulting from the reaction between aluminum, a titanium halide and titanium dioxide. The olefinic feed charge is contacted with the resulting catalyst material under polymerization conditions, and the higher molecular weight polymer product is recovered from the reaction. The solid catalyst material may be separated from the polymer product by conventional means such as filtering, centrifuging or the like. The polymerization reaction employing our inventive process is readily adaptable to a wide range of operating conditions, but the reaction conditions depend to a large extent upon the character of the polymer sought and the specific composition of the catalyst, as described hereinafter in greater detail.

The catalyst of our invention is prepared by reacting together an admixture of aluminum, a titanium halide and titanium dioxide at an elevated temperature and in the presence of an inert gas. The temperature for carrying out the reaction in preparation of the catalyst is in the range of from about 600° to 1400° F., and more preferably 800° to 900° F. The components are allowed to react within the desired temperature range for about 15 minutes to 3 hours, preferably for about ½ hour to 1½ hours, and in any event for a sufficient length of time to allow all the components to react. The reaction is carried out in an inert atmosphere, for example nitrogen.

In the preferred embodiment of the present invention, the titanium halide is in its highest valence state, and upon reaction is readily reduced to a relatively lower valence state thereby resulting in a catalyst of increased activity. Titanium tetrachloride reacts readily with the aluminum and titanium dioxide at the elevated temperature and exhibits high catalytic activity and therefore is particularly useful in the preparation of the catalyst. In the preferred method for preparing the catalyst, the aluminum and titanium dioxide are mixed together in the desired proportions and heated to an elevated temperature and for a period of time within the above described ranges. Upon addition of the required amount of titanium tetrachloride to the heated mixture, an exothermic reaction occurs, thereby resulting in the formation of the desired catalyst of high activity.

The proportion of total titanium employed in the catalyst to aluminum can be varied, and may range from about 0.25 mol to about 5 mols of titanium per one mol of aluminum. More preferably, titanium is employed in proportions between about 0.5 mol to 2 mols per mol of aluminum. Generally the titanium content is between about 20 to 50 weight percent of the total catalyst.

Isobutylene may be polymerized in accordance with the present invention using our catalyst in either the gas phase or liquid phase. Generally, it is more advantageous and convenient to conduct the polymerization in a liquid phase operation because the reaction conditions are more easily controlled and the activity of the catalyst is not as readily diminished as in gas operations. In conducting the polymerization under a liquid phase, it is often desirable to employ a solvent or diluent for the feed stock which provides an inert liquid reaction medium for the polymerization reaction. A saturated hydrocarbon may be suitably employed as the solvent or diluent, and includes, for example, pentanes, hexanes, heptanes, etc. The solution of isobutylene prepared in the desired diluent may then be readily contacted with the polymerization catalyst.

The polymerization process may occur over a rather wide temperature range, but is generally conducted at a temperature of from about −100° F. to 200° F., and more preferably within a range of −40° F. to 150° F. Although higher pressures favor the polymerization reaction, relatively low pressures can be employed in the process which may include, under suitable conditions, pressures as low as atmospheric pressure or lower. However, the pressure may vary over a wide range and may be as high as 200 p.s.i.g., or higher. A generally useful and desirable pressure range is between about 0 p.s.i.g. and 60 p.s.i.g., preferably between about 0 p.s.i.g. and 40 p.s.i.g. The contact time or space velocity employed in the polymerization process will be selected with reference to the other process conditions, and catalyst. A suitable liquid hourly space velocity may range from about 0.2 to 5.0 v./hr./v., preferably from about 0.5 to 2.0 v./hr./v., but may be varied to obtain the desired results. Thus, it should be understood that the various operating conditions for the process may be varied over a wide range, and depends to some extent upon the catalyst employed and the end product desired. However, these optimum conditions can be readily ascertained by experimentation by one skilled in the art.

The polymers produced in the catalyst polymerization of our process have many useful applications. These may include the production of synthesis of valuable organic chemicals, resins, plastics, etc. In addition, it is possible to produce polymers in the viscosity range of lubricating oils, or the polymers may be used in other applications where olefin derivatives are desired.

The following example further illustrates the catalytic polymerization of our invention.

The catalyst was prepared by initially mixing together 0.4 mol aluminum powder and 0.25 mol of titanium dioxide, and heating the mixture to 842° F. for one hour in a nitrogen atmosphere. To this hot mixture was added 0.05 mol of titanium tetrachloride, and an exothermic reaction occurred resulting in the formation of a black powder.

Two grams of catalyst prepared from the reaction was placed in a tube, and 100 grams of isobutylene dissolved in 100 mol of heptane as a diluent was added to the tube. The polymerization reaction was allowed to proceed for 2 hours at 14° F. temperature and atmospheric pressure. A total volume of 46.2 grams of polymer was collected, the polymer having a viscosity average molecular weight of 14,000.

Having described my invention, I claim:
1. A process for the polymerization of isobutylene to form higher molecular weight polymers thereof which comprises contacting said isobutylene in an inert liquid reaction medium under polymerization conditions including a temperature in the range of from about −100° F. to 200° F. and under a pressure of from about 0 p.s.i.g. to 200 p.s.i.g. with a polymerization catalyst prepared by mixing together aluminum and titanium dioxide at a temperature of from about 600° F. to 1400° F. and for a time from about 15 minutes to 3 hours, and adding titanium tetrachloride to said heated mixture, the molar ratio of total titanium to aluminum in said catalyst being about 0.25 to 5 mols of titanium to 1 mol of aluminum.

2. A process according to claim 1 in which the molar ratio of said titanium to aluminum in said catalyst is from about 0.5 to 2 mols of titanium to 1 mol of aluminum.

3. A process for preparing a catalyst for the polymerization of isobutylene which comprises mixing together aluminum and titanium dioxide at a temperature of from about 600° F. to 1400° F. and for a time of from about 15 minutes to 3 hours, and adding titanium tetrachloride to said heated mixture, the molar ratio of total titanium to aluminum in said catalyst being about 0.25 to 5 mols of titanium to 1 mol of aluminum.

4. The process according to claim 3 wherein the molar ratio of total titanium to aluminum in said catalyst is from about 0.5 to 2 mols of titanium to 1 mol of aluminum.

5. The process according to claim 3 wherein said temperature for said reaction is from 800° F. to 900° F., and said time for said reaction is ½ hour to 1½ hours.

References Cited in the file of this patent

UNITED STATES PATENTS

| | | |
|---|---|---|
| 2,928,818 | Carter et al. | Mar. 15, 1960 |
| 3,008,943 | Guyer | Nov. 14, 1961 |
| 3,010,787 | Tornqvist | Nov. 28, 1961 |